US008139565B2

United States Patent
Ionescu

(10) Patent No.: US 8,139,565 B2
(45) Date of Patent: Mar. 20, 2012

(54) TELECOMMUNICATIONS SYSTEM AND METHOD FOR CONNECTING A CSTA CLIENT TO SEVERAL PBXS

(75) Inventor: Alexandru Ionescu, Bucharest (RO)

(73) Assignee: Zoltes, Inc., Anderson, SC (US)

(*) Notice: Subject to any disclaimer, the term of this patent is extended or adjusted under 35 U.S.C. 154(b) by 293 days.

(21) Appl. No.: 12/367,771

(22) Filed: Feb. 9, 2009

(65) Prior Publication Data

US 2010/0202437 A1 Aug. 12, 2010

(51) Int. Cl.
*H04L 12/66* (2006.01)

(52) U.S. Cl. .................................. 370/352; 370/535

(58) Field of Classification Search ...................... None
See application file for complete search history.

(56) References Cited

U.S. PATENT DOCUMENTS

| | | | | |
|---|---|---|---|---|
| 6,625,168 | B1 * | 9/2003 | Langer et al. | 370/466 |
| 7,035,248 | B2 * | 4/2006 | Wengrovitz | 370/352 |
| 7,149,297 | B2 * | 12/2006 | Idoni et al. | 379/201.02 |
| 7,716,311 | B2 * | 5/2010 | Brown et al. | 709/223 |
| 2003/0021397 | A1 * | 1/2003 | Wengrovitz | 379/93.15 |
| 2004/0062271 | A1 * | 4/2004 | Oliver et al. | 370/466 |
| 2004/0136346 | A1 * | 7/2004 | Booton | 370/338 |
| 2006/0036738 | A1 * | 2/2006 | Hemmady | 709/227 |
| 2008/0205623 | A1 * | 8/2008 | Schroter et al. | 379/229 |
| 2009/0031043 | A1 * | 1/2009 | Schaade | 709/245 |
| 2009/0238171 | A1 * | 9/2009 | Ionescu et al. | 370/352 |
| 2011/0075665 | A1 * | 3/2011 | Lederer | 370/392 |

* cited by examiner

*Primary Examiner* — Phirin Sam

(74) *Attorney, Agent, or Firm* — Overhauser Law Offices, LLC

(57) ABSTRACT

The presently disclosed Demultiplexer Application associated with a server or other processor (S) (collectively "Demultiplexer") enables a computer telephony Client Application (CA), for example a Computer-Supported Telecommunications Application (CSTA) Client Application, to connect to several Communication Devices (PBX1, . . . , PBXn) simultaneously, even though the Client is designed to only connect to a single Communication Device. The Demultiplexer provides an interface between the single access Client Application and the multiple Communication Devices simultaneously connected to the Demultiplexer via computer telephony, for example, using CSTA. When the Client Application attempts a an association with a target Communication Device, the Demultiplexer establishes two parallel processes: (1) a dialogue process between the Client Application and the Demultiplexer, and (2) a dialogue process between the target Communication Devices and the Demultiplexer.

20 Claims, 11 Drawing Sheets

TELECOMMUNICATIONS SYSTEM AND METHOD FOR CONNECTING A CSTA CLIENT TO SEVERAL PBXS

SUMMARY

The present invention may comprise one or more of the features recited in the attached claims, and/or one or more of the following features and combinations thereof.

The invention relates to a telecommunication system that consists of a computer telephony Client Application (CA), for example a Computer-Supported Telecommunications Application (CSTA) Client Application, that has the limitation of being designed to connect to only one Communication Device, for example a PBX, at a time. The presently disclosed Demultiplexer Application associated with a server or other processor (S) (collectively "Demultiplexer") can be included in the system to overcome this limitation. The Demultiplexer enables the Client Application to connect to several Communication Devices (PBX1, . . . , PBXn) simultaneously, even though the Client Application is designed to only connect to a single Communication Device.

The method for connecting a single Client Application to several Communication Devices (PBX1, . . . , PBXn) simultaneously can be implemented as a Demultiplexer as described herein. The Demultiplexer provides an interface between the single access Client Application and the multiple Communication Devices simultaneously connected to the Demultiplexer via computer telephony, for example using CSTA. When the Client Application attempts an association with a target Communication Device, the Demultiplexer establishes two parallel processes: (1) a dialogue process between the Client Application and the Demultiplexer, and (2) a dialogue process between the target Communication Devices and the Demultiplexer. Thus, the Demultiplexer can use CSTA to connect to the single access Client Application on one end and to connect simultaneously to multiple Communication Devices (PBX1, . . . , PBXn) on the other end. The Demultiplexer provides access for multiple simultaneous CSTA connections associated with the Communication Devices (PBX1, . . . , PBXn) using a single CSTA connection with the Client Application. Thus, the Client Application is enabled to operate with multiple Communications Systems even though it is designed to be connected via CSTA, or other computer telephony, with only one Communication Device.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
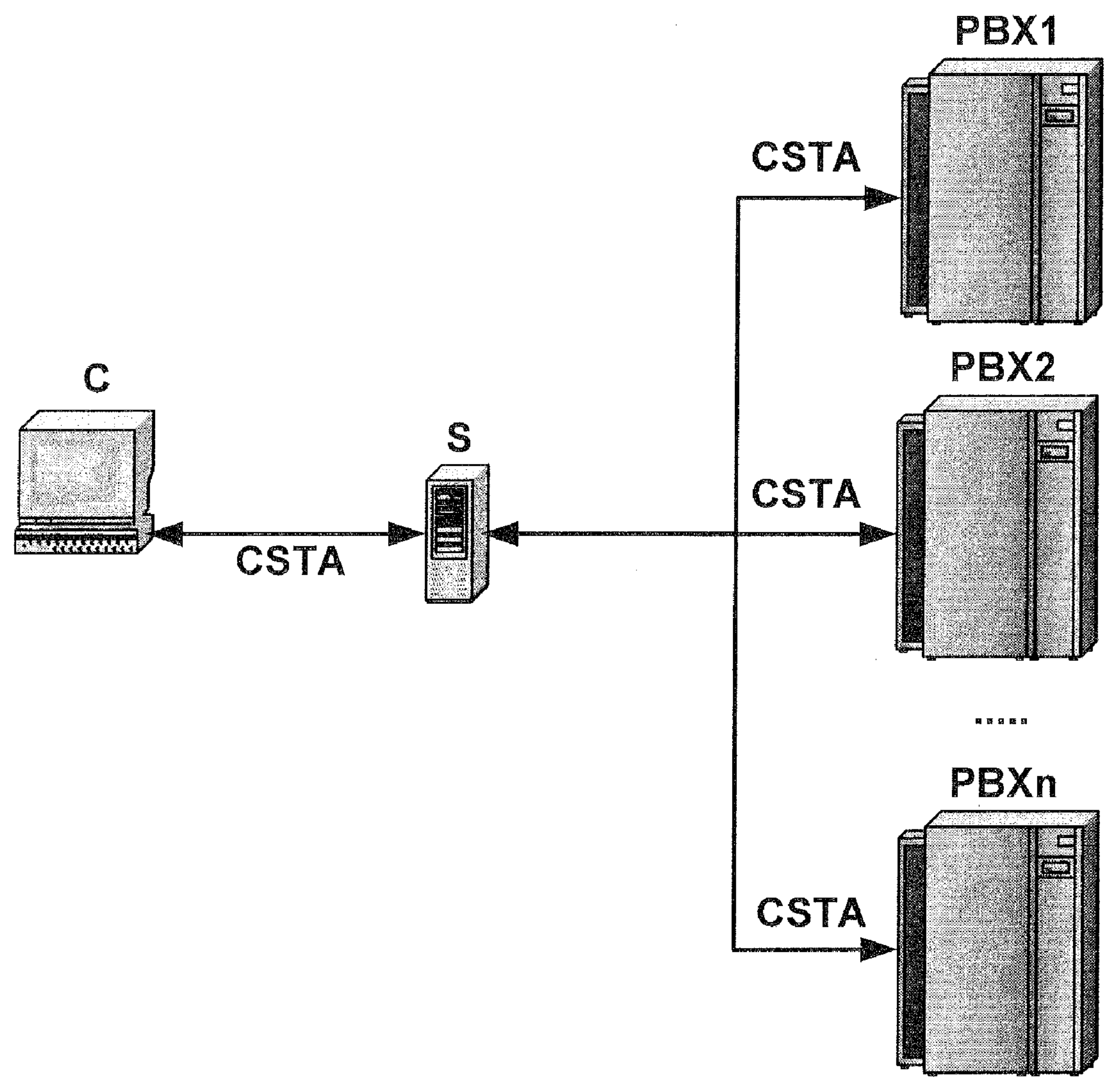
FIG. 1 is a general block diagram of a telecommunications system according to the present disclosure.

For the purposes of promoting and understanding the principals of the invention, reference will now be made to one or more illustrative embodiments illustrated in the drawings and specific language will be used to describe the same.

CSTA is the Computer Supported Telephony Applications standard which defines communication, for example an abstraction layer, between telecommunications devices, for example, as described in the international standard ECMA-269. CSTA is used, for example, to implement computer telephony. Although the illustrative embodiment is disclosed as using CSTA, other computer telephony integration techniques or standards may also be supported and/or used to implement the presently disclosed Demultiplexer.

Client Application refers to a software application that can connect to a server application and that can communicate with the server application by using computer telephony integration, for example CSTA.

There are systems and methods for connecting several Client Applications to a Communication Device through the CSTA standard, but they present the disadvantage of the Client Application being limited to operating with only one Communication Device at a time.

According to the present disclosure, an illustrative telecommunications system lacks the disadvantage mentioned above, and includes:

multiple Communication Devices;

a Demultiplexer, for example including a processor and a Demultiplexer Application, is simultaneously connected for computer telephony to several Communication Devices;

a Client Application, for example of a Client (C), which perceives the Demultiplexer Application as the only device.

The Demultiplexer processor can comprise a server, for example consisting of a central processing unit that includes an execution control module, a nonvolatile memory, a volatile memory in which the specialized application is loaded, an input/output unit block, an optional external data storage block and a clock that provides a periodical signal assuring the synchronization of the server components. All the server elements are typically interconnected through a data bus.

The illustrative method used for connecting the Client Application to several Communication Devices and applied in the telecommunications system described above can be implemented as a Demultiplexer Application that runs on a processor (Demultiplexer) and that establishes a link between a Client Application and more than one Communication Device. The illustrative method includes two parallel processes that are implemented by the Demultiplexer:

a first dialogue is initiated between the Client Application that is attempting to establish an association and the Demultiplexer Application; and a second dialogue is initiated between each Communication Devices and the Demultiplexer Application through the execution of the Communication Device communication code.

In one illustrative embodiment the Client Application is executed by a Client (C). In another illustrative embodiment the Client Application and Demultiplexer Application are both executed by a single server or other processing device.

First Dialog Process Overview

According to an illustrative embodiment, the connection method used in the first dialogue process between the Demultiplexer and the Client Application includes at least one of the following steps:

Wait for a connection attempt from the Client Application. If the connection is established, wait for the Client Application to send an ACSE (Association Control Server Element) Request message.

Check if a CSTA association is established between the Demultiplexer and at least one Communication Device and if one Client Application is already associated. If there is no established CSTA association but there is already a Client Application associated, reply to the Client Application with an ACSE Rejected message and loop back to the point where an ACSE Request message from the Client Application is expected.

When ACSE Request message is received, if an established CSTA association between the Demultiplexer Application and at least one Communication Device exists and there is no associated Client Application, reply to the Client Application with the ACSE Accepted message and start waiting for messages from the Client Application, else close the Client Application connection. At the same time, start recurrently sending the SystemStatus Invoke to the Client Application. If the Client Application does not respond consecutively to three Invokes, send the ACSE Abort message and close the connection with the Client Application.

Until the closing of the Client Application connection, for every message received from the Client Application, check if it is a CSTA Invoke. If it is a CSTA Invoke, resume this message and check if the message is a CSTA Response.

If the message is not a CSTA Invoke and if it is a CSTA Message, check if the message is a Positive Acknowledgement for SystemStatus Invoke. If it is, mark client's response and ignore the message if it is a CSTA Response but not a Positive Acknowledgement. Check if the message is an ACSE Release and not a CSTA Response. In the case when the message is not an ACSE Release, check if the message is an ACSE Abort, and if not, ignore the message. Close the Client Application connection if the message is an ACSE Abort. Send the Response to ACSE Release message and close the Client Application connection, if the message is an ACSE Release.

Upon the closing of the Client Application connection, loop back to the point where a client connection is waited for.

Second Dialog Process Overview

According to the illustrative embodiment, the connection method used in the second dialogue process between the Multiplexer and each Communication Device through the Demultiplexer Application comprises at least one of the following steps:

Attempt to connect the Demultiplexer to the Communication Device. If the attempt is not successful, wait a predefined delay, for example ten seconds, and then again try to connect to the Communication Device.

When the connection succeeds, send the ACSE Request to the Communication Device. Check if the Request is accepted. If not, wait a predefined delay, for example five seconds, and then loop back to the step where the ACSE Request is sent.

When the Request is accepted, start sending GetSwitchingFunctionDevices Invokes for every type of Device and wait to fill in the Devices list of this Communication Device relying on the response and the corresponding SwitchingFunctionDevices lists. Next, start waiting for CSTA messages from the Communication Device. For each CSTA message received from the Communication Device, check if it is a CSTA Response, process this Response, and check if it is a CSTA Invoke. If it is not a CSTA Response and if it is a CSTA Invoke, process this Invoke and ignore any message if it is not a CSTA Invoke.

Demultiplexer Overview

A telecommunications system according to the present disclosure provides the advantage of enabling the use of a Client Application designed to be linked to only one Communication Device, to be instead linked with more than one Communication Device at the same time.

An illustrative embodiment is shown in FIGS. 1-7 and is further described below.

Figure 2:
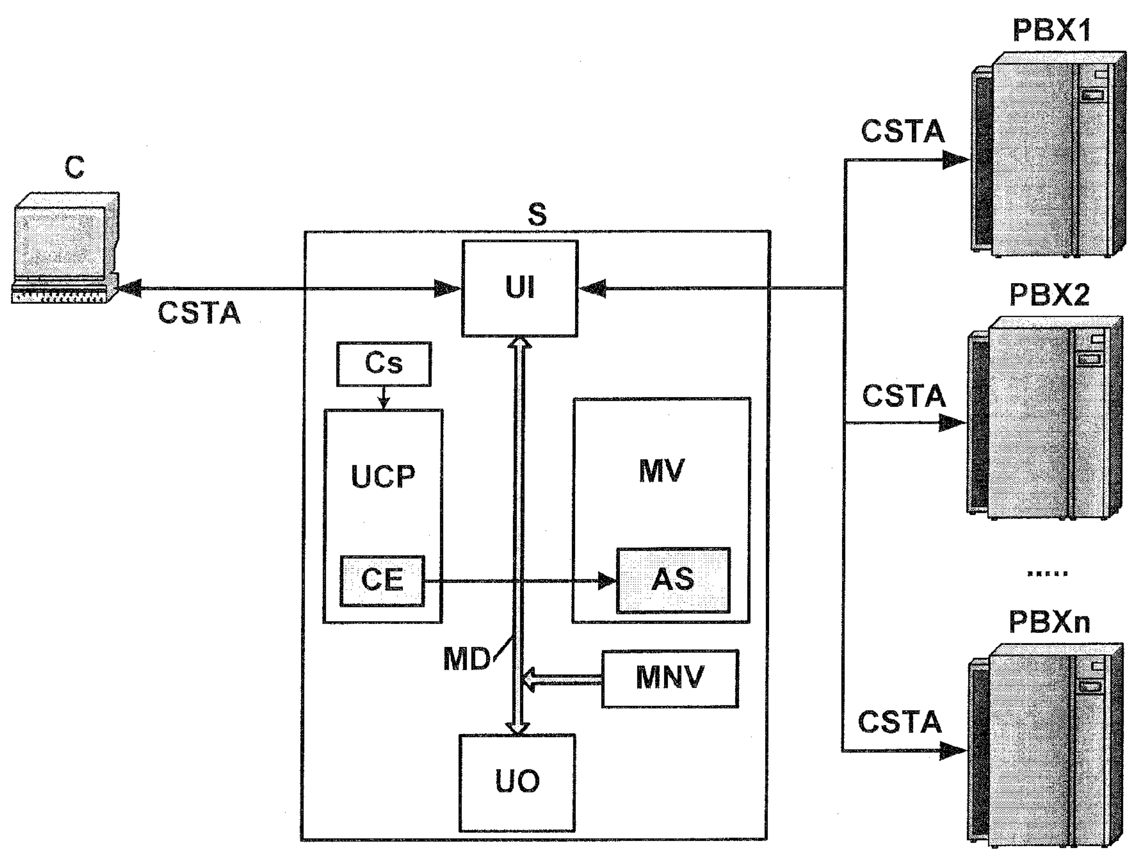
FIG. 2 is a functional block diagram of the Demultiplexer of the telecommunications system of FIG. 1.

As shown in FIGS. 1 and 2, an illustrative telecommunications system includes a Client Application stipulated to work with only one Communication Device, a Demultiplexer S including a processor and a Demultiplexer Application, and several Communication Devices: PBX1, . . . PBXn that can be simultaneously connected to the Demultiplexer. The Demultiplexer is perceived by the Client Application to be only a single CSTA server. The Demultiplexer connects the Client Application, for example running on Client C, to the Communication Devices PBX1, . . . PBXn by mediating the signal transmissions from the Client Application to the Communication Devices PBX1, . . . PBXn, and from the Communication Devices PBX1, . . . PBXn, to the Client Application.

As shown in FIG. 2, an illustrative Demultiplexer S includes a processor such as a server, which may include, for example, one or more of the following:

- Central processing unit CPU. The central processing unit CPU coordinates the activity of the entire system, assures the data processing (interpretation, processing, control), supervises the information transfers and controls the application execution. The CPU includes an execution control module EC.
- Nonvolatile memory (for example Flash/ROM type) NVM. The nonvolatile memory NVM is a permanent type memory that stores information needed for processor initialization at startup.
- Volatile memory (for example RAM type) VM. The volatile memory VM is usually used for loading the programs running on the system, for data and variables storage. For example, the Demultiplexer Application can be loaded at runtime in the VM memory and the pieces of received and processed information also stored.

The execution control module EC of the central processing unit controls the execution of the Demultiplexer Application. The Application operates by accepting, processing, and sending messages from and to the Client Application, and also from and to the Communication Devices PBX1, . . . PBXn. Thus mediating messages from the Client Application directed to one of the Communication Devices and from one of the Communication Devices direct to the Client application.

In processing the messages from the Client Application, the Demultiplexer Application generates messages to the Communication Devices PBX1, . . . PBXn or to the Client Application as direct responses. By processing the messages from the Communication Devices PBX1, . . . PBXn, the Demultiplexer Application generates messages to the Client Application or direct responses to the Communication Devices PBX1, . . . PBXn.

- Input/output unit block (for example Ethernet/USB type) IO. The input/output unit block IO assures the connectivity of the system with the environment by receiving and delivering the information from and to the external devices connected or through the data transmission environments. This block supports the communication process between the Demultiplexer S and the Client Application, and also between the Demultiplexer S and the Communication Devices: PBX1, . . . PBXn.

External data storage units block OU. The OU block provides attachment of auxiliary external data storage devices with large capacity (e.g. HDD).

Clock Clk. The Clock provides a periodical signal that assures the synchronization between the components of the Demultiplexer S. The functional elements of the Demultiplexer S can be interconnected through a data bus BUS.

According to the illustrative embodiment, the execution of the Demultiplexer Application generates data flows in the processor, including, for example:

Between the input/output units IO and the volatile memory VM, responses or events from the Client Application are received and messages or events are transmitted to the Client Application. Additionally, messages or events from the Communication Devices PBX1 . . . PBXn are received and responses are transmitted to the Communication Devices PBX1, . . . PBXn. Between the volatile memory VM and the central processing unit CPU, messages from the Client Application are transmitted for processing and messages and events are generated for the Client Application, which are transmitted further through the input/output units block IO. Additionally, messages from the Communication Devices PBX1, . . . PBXn are transmitted for processing and the responses are generated for the Communication Devices, PBX1, . . . PBXn that are further transmitted through the input/output units block IO. Data flows can be transmitted through the data bus BUS.

Although in one illustrative embodiment the Client Application is executed by a first processor, for example Client (C), and the Demultiplexer Application by a second processor, for example Server (S), in another illustrative embodiment the Client Application and Demultiplexer Application are both executed by a single server or other processor.

Dialog Processes

An illustrative method for connecting a Client Application to several Communication Devices, stipulated to work with only one PBX, includes at least one of the following processes:

First Dialog Process

A first dialogue process, provided by the Demultiplexer Application, between the Demultiplexer S and the Client Application that has initiated a CSTA association (connection).

A second dialogue process, provided by the Demultiplexer Application, between the Demultiplexer S and the Communication Devices: PBX1, . . . PBXn, by executing the communications code received from a Communication Device.

Figure 3A:
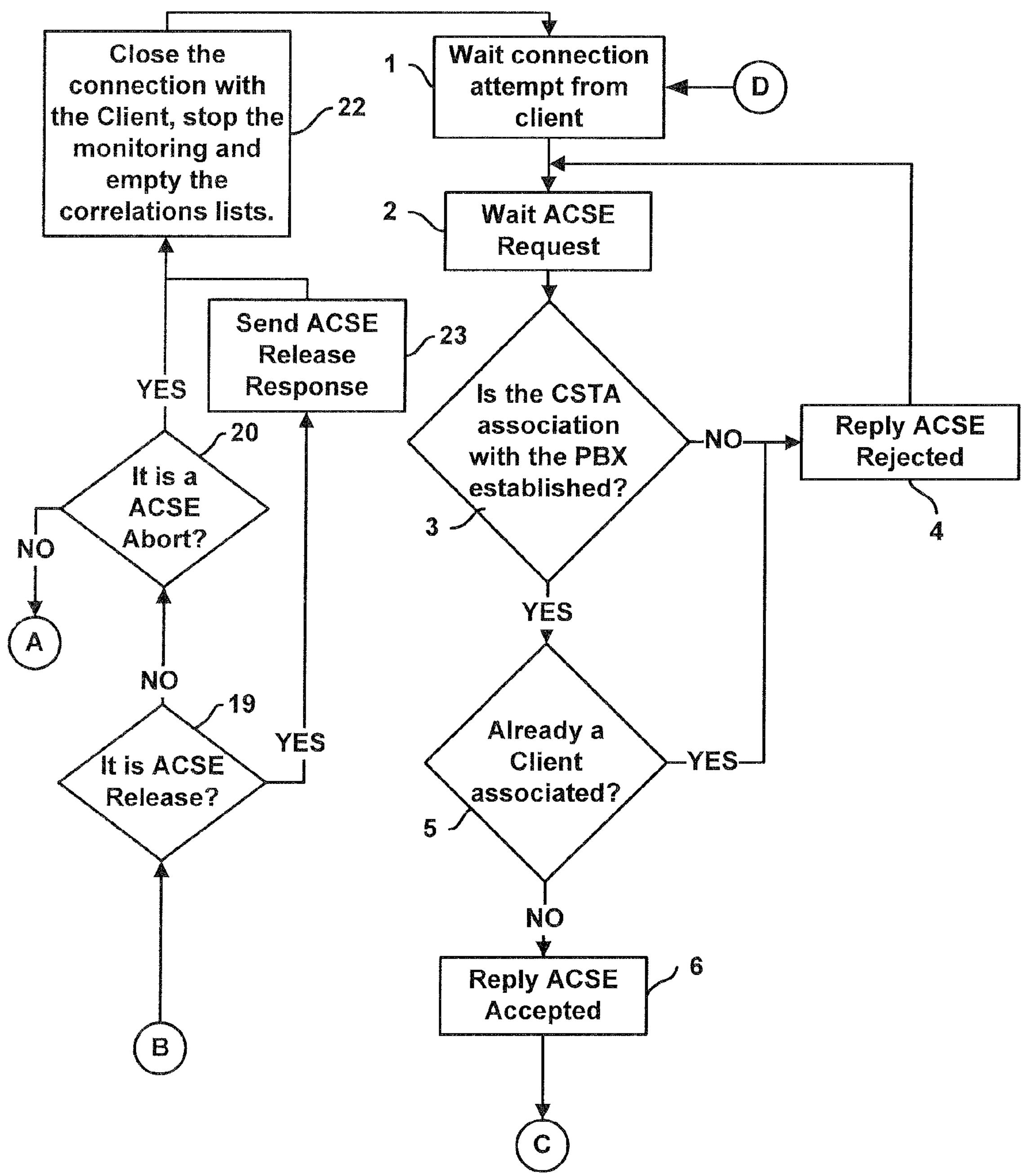
FIG. 3 is a block diagram of an algorithm associated with the Demultiplexer of FIG. 2 and for interfacing the Demultiplexer to a Client Application.
Figure 3B:
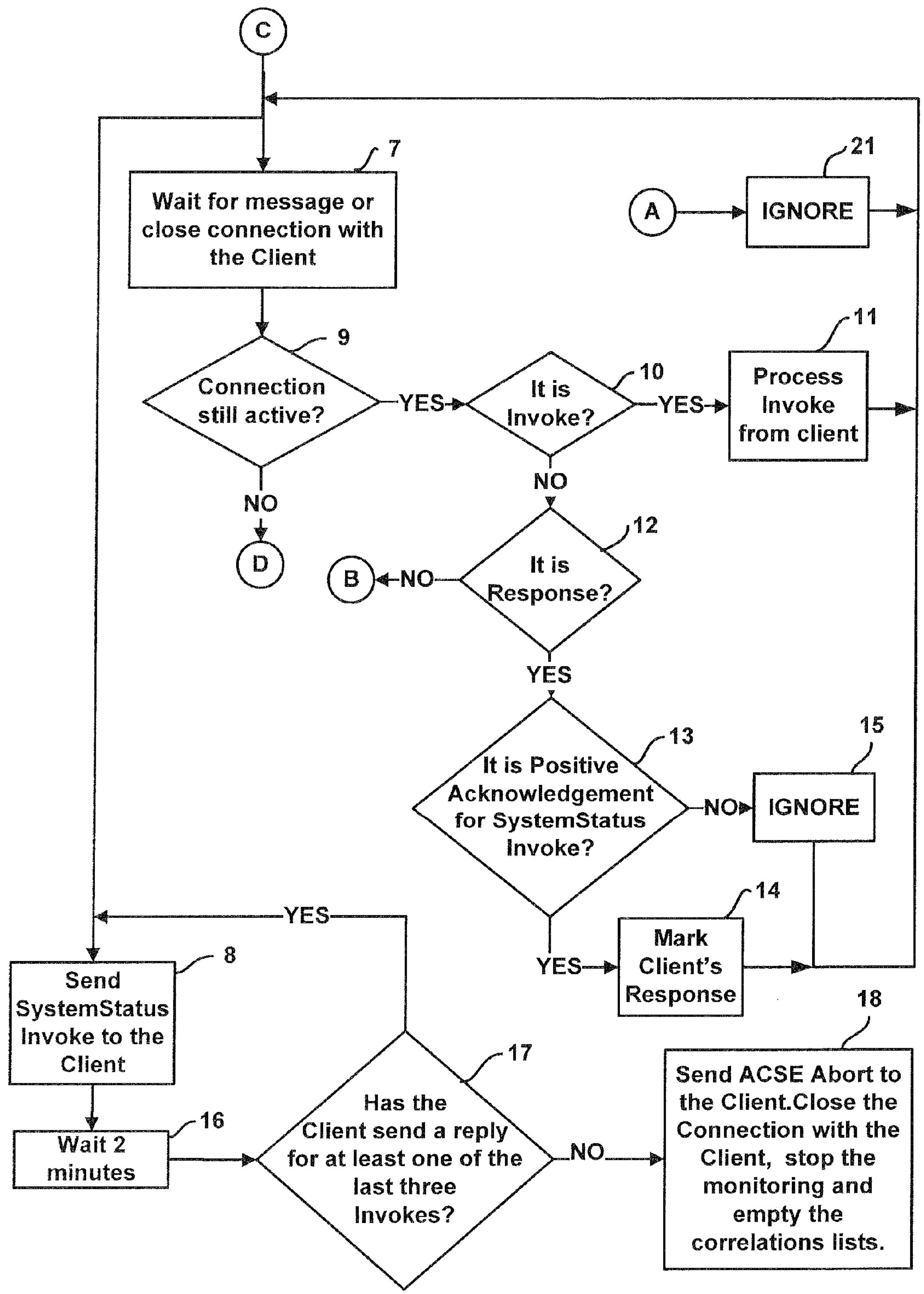

As shown in FIG. 3, the illustrative first dialogue process between the Demultiplexer S and the Client Application includes one or more of the following illustrative steps:

At step 1, wait for a connection (connection request) from the Client Application.

If this connection is established, at step 2, wait for the Client Application to send an ACSE Request message, where ACSE (Association Control Server Element) is an association element for server control.

Further, at step 3, check if the Demultiplexer Application has an accepted connection to at least one Communication Device.

If the connection is not accepted, then at step 4, the ACSE Rejected CSTA message is sent to the Client Application and loop back to step 2 at which an ACSE Request message is waited upon.

At step 3, if the Demultiplexer Application has an accepted connection to at least one Communication Device, then at step 5, check if there is already a Client Application associated.

If a Client Application is already associated, then at step 4, reply to the Client Application with an ACSE Reject and loop back to step 2. If there is no other Client Application associated at step 5, then at step 6, reply to the Client Application with an ACSE Accepted message.

At step 7, start waiting for messages from then Client Application or losing the connection with this Client. At the same time, at step 8, start sending periodic SystemStatus Invokes to the Client.

After sending SystemStatus Invoke to client at step 8, wait two minutes at step 16.

Continue with step 17 and check if there is at least one response from the Client for the last three SystemStatus Invokes sent. If a response was received from the Client, then at step 8 send the next SystemStatus Invoke.

If there is no response from the client for any of the last three SystemStatus Invokes sent, then at step 18, send an ACSE Abort to the Client Application and close the connection with the client, send StopCallDetailRecordsTransmission Invokes for each element from the CrossRefID CallDetailRecords list (CRI CDRL), send StopMonitor Invokes for each element from the CrossRefID monitor list (CRIML), send StopDataCollection Invokes for each element from the CrossRefID DataCollection list (CRI DCL), and reset CRI CDRL, CRIML, CRI DCL, connectionID list (CL), Invokes list (IL), special Invokes list (SIL).

After step 7, at step 9, check if the connection with the Client is still active and if the connection is not active then loop back at step 1 to wait for reconnection of the Client.

Figure 4A:
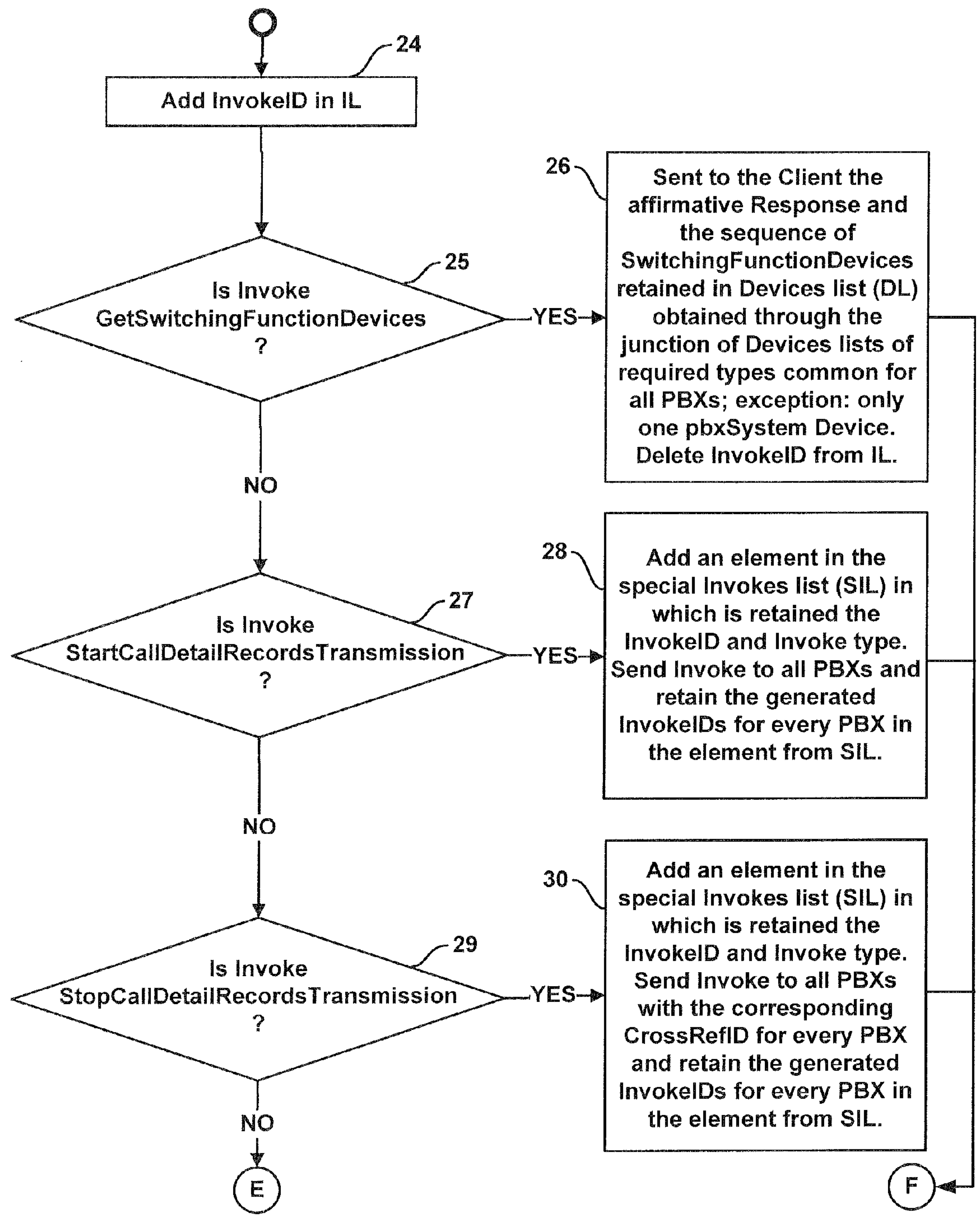
FIG. 4 is a block diagram of an algorithm associated with the Demultiplexer of FIG. 2 and for processing a CSTA Invoke received from the Client Application.
Figure 4B:
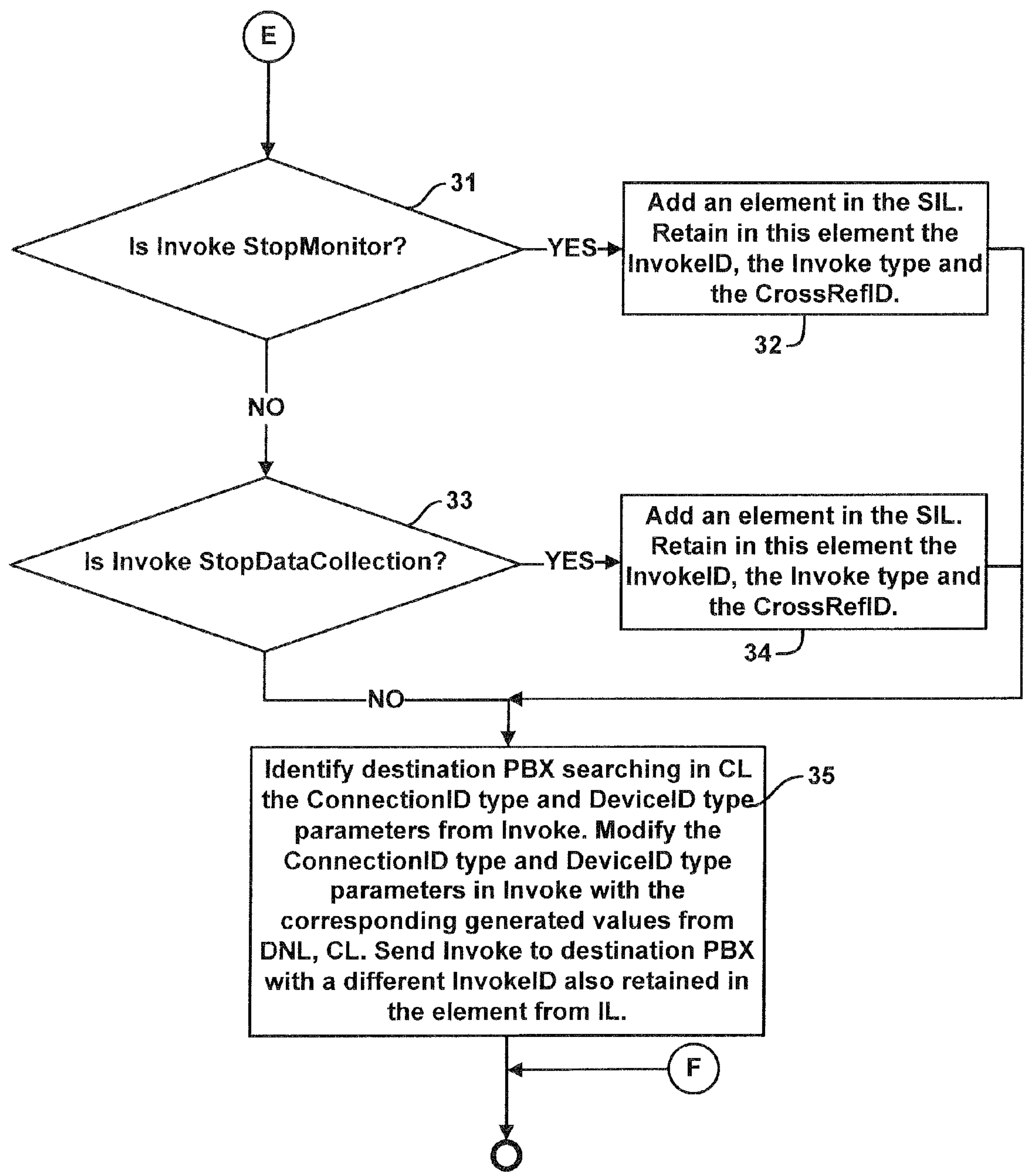

Until the lost connection with the Client Application is ascertained, for every received message at step 7 from the Client Application, at step 10 check if the message is a CSTA Invoke. If this message if a CSTA Invoke, at step 11 process the CSTA Invoke message from the Client Application as is described further below and is illustrated in FIG. 4.

If at step 10 the CSTA Invoke message is not confirmed, at step 12 check if the message is a CSTA Response.

If the message is a CSTA Response, at step 13 check if Response is a Positive Acknowledgement for SystemStatus Invoke, and if it is, at step 14 mark the response of the Client. If the condition from step 13 is not confirmed, at step 15 the message is ignored.

If at step 12 the CSTA Response message is not confirmed, then at step 19 check if the message is an ACSE Release. If the message is not an ACSE Release, at step 20, check if the message is an ACSE Abort.

If the message is not an ACSE Abort, at step 21 the message is ignored. If at step 20 the ACSE Abort message is confirmed, close the connection with the Client Application at step 22, and loop back to step 1 to wait for reconnection of the Client.

If at step 19 the ACSE Release message is confirmed, then at step 23 send the Response to the ACSE Release message to the Client Application and at step 22, close the connection with the Client Application, send StopCallDetailRecordsTransmission Invokes for each element from the CrossRefID CallDetailRecords list (CRI CDRL), send StopMonitor Invokes for each element from the CrossRefID monitor list (CRIML), send StopDataCollection Invokes for each element from the CrossRefID DataCollection list (CRI DCL), and reset CRI CDRL, CRIML, CRI DCL, connectionID list (CL), Invokes list (IL), special Invokes list (SIL). After step 22, loop back to step 1 to wait for reconnection of the Client.

Illustrative processing of the CSTA Invoke message from the Client Application at step 11 of FIG. 3 is further shown in FIG. 4 and described below, including one or more of the illustrative steps:

At step 24, insert the InvokeID in the non-processed Invokes list (IL) and then, at step 25 check if Invoke is GetSwitchingFunctionDevices. If confirmed, at next step 26, send to the Client a GetSwitchingFunctionDevices Response and the sequence of the SwitchingFunctionDevices retained in Devices list (DL) obtained through the junction of Devices lists of required types common for all Communication Devices except the pbxSystem type for which only one Device is returned. Next, delete the corresponding element from the InvokeID list (IL).

If at step 25 Invoke is not a GetSwitchingFunctionDevices, at step 27, check if the Invoke is a StartCallDetailRecordsTransmission. If confirmed, at step 28, add an element in the special Invokes list (SIL), save in the element the InvokeID and Invoke type, and send the Invoke to all Communication Devices and save the generated InvokeIDs for every Communication Device in the element from the special Invokes list (SIL).

If at step 27 the Invoke is not a StartCallDetailRecordsTransmission, at step 29, check if it is a StopCallDetailRecordsTransmission. If confirmed, at step 30, add an element in the special Invokes list (SIL), save in the element the InvokeID and the Invoke type, and send Invokes to all Communication Devices with CrossRefID CallDetailRecords (CRI CDR) corresponding to each Communication Device (saved in CrossRefID CallDetailRecords list), saving the generated InvokeIDs for every Communication Device in the element from the special Invokes list (SIL).

If at step 29 the Invoke is not a StopCallDetailRecordsTransmission, at step 31, check if the Invoke is a StopMonitor. If confirmed, at step 32, add an element in the special Invokes list (SIL) that saves the InvokeID, the Invoke type, and CrossRefID. Next go to step 35 and start the last general processing.

If at step 31 the Invoke is not a StopMonitor, at step 33 check if the Invoke is a StopDataCollection. If confirmed, at step 34, add an element in the special Invokes list (SIL) that saves the InvokeID, the Invoke type, and CrossRefID. Next go to step 35 and start the last general processing.

At step 35, identify the destination Communication Device by detecting the parameter's correlation from Invoke of ConnectionID type, DeviceID in DeviceNumber list (DNL) and ConnectionID list (CL). Then, modify the ConnectionID parameters, DeviceID parameters in Invoke with corresponding generated values from DeviceNumber list (DNL) and ConnectionsID list (CL), and send an Invoke to the destination Communication Device with a different InvokeID, kept as well in the non-processed Invokes list (IL).

After step 35, processing continues at step 7 of FIG. 3.

Second Dialog Process

Figure 5:
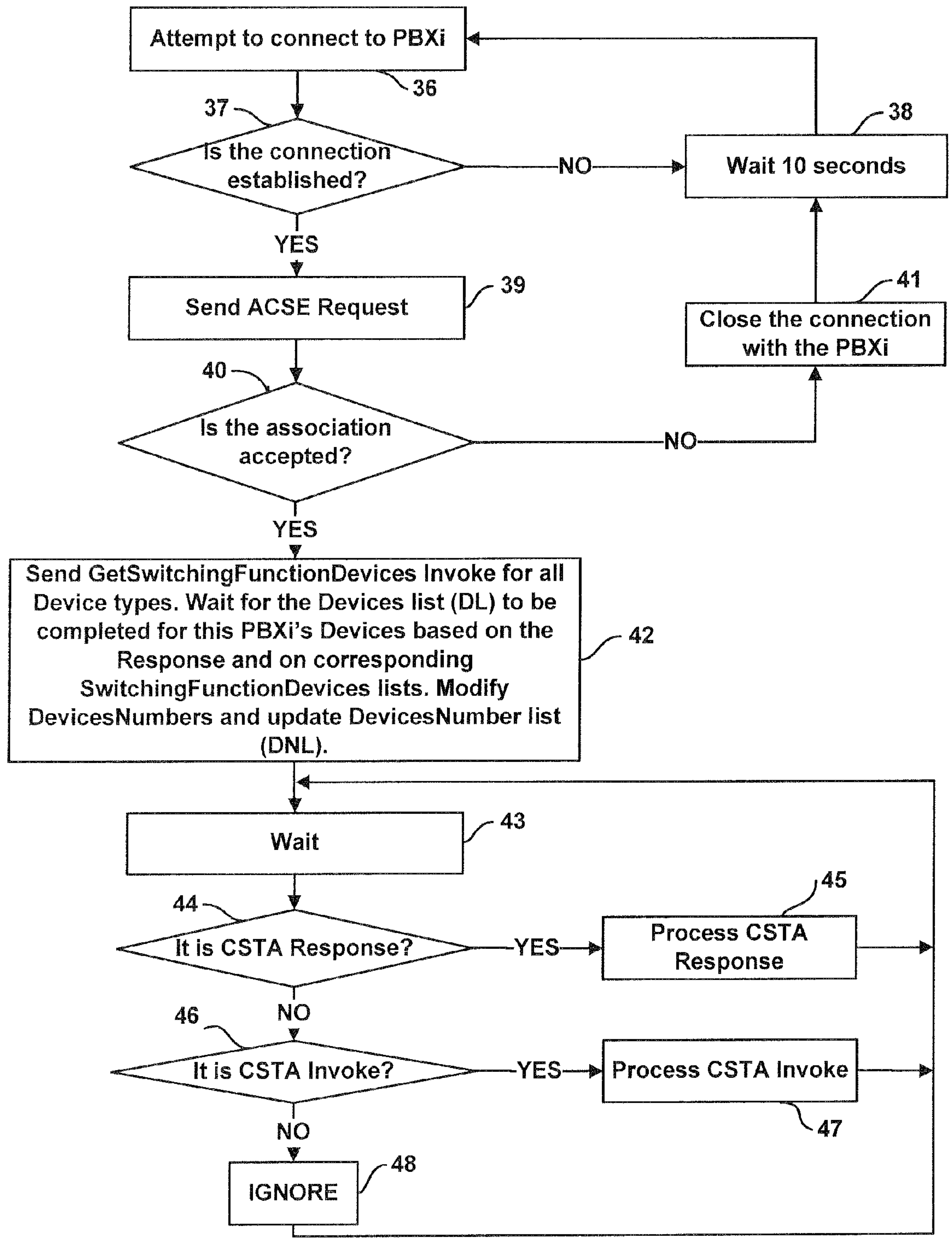
FIG. 5 is a block diagram of an algorithm associated with the Demultiplexer of FIG. 2 and for interfacing the Demultiplexer to each of the Communication Devices.

As shown in FIG. 5, the illustrative second dialogue process provided by the Demultiplexer Application between the Demultiplexer S and each of the Communication Devices includes one or more of the following illustrative steps:

At Demultiplexer Application startup, at step 36, try to connect to the Communication Device PBXi.

At step 37, check if the connection succeeded. If not, at step 38, wait a predetermined time, for example ten seconds, and then loop back to step 36 to retry to connect to the PBXi.

If at step 37 the connection of the Demultiplexer Application to the PBXi is confirmed to be established, at step 39 send a ACSE Request message to the PBXi.

At step 40, check if the PBXi accepts the association request. If not, at step 41, close the connection with PBXi and at step 38 wait for a predetermined time, for example ten seconds, and then return to step 36 to retry connecting to the PBXi.

If at step 40 it is confirmed that the association to the PBXi is accepted, then at step 42 send a GetSwitchingFunctionDevices Invoke for all Device types to the PBXi, and then wait for the Devices list (DL) to be completed for this PBXi's Devices based on the Response and on corresponding SwitchingFunctionDevices lists. Modify DevicesNumbers and update the DevicesNumber list (DNL).

At step 43, start waiting for CSTA messages from PBXi. For every message received from the PBXi, at step 44, check if the message is CSTA Response type. If confirmed, at step 45, process the CSTA Response message from the PBXi, as if described further below and shown in FIG. 6.

If at step 44 it is determined that the message is not a CSTA Response type, at step 46, check if the message is CSTA Invoke type.

If at step 46 it is confirmed that the message is a CSTA Invoke type, at step 47, process the CSTA Invoke message. If it is not CSTA Invoke type, this message is ignored at step 48.

Figure 6A:
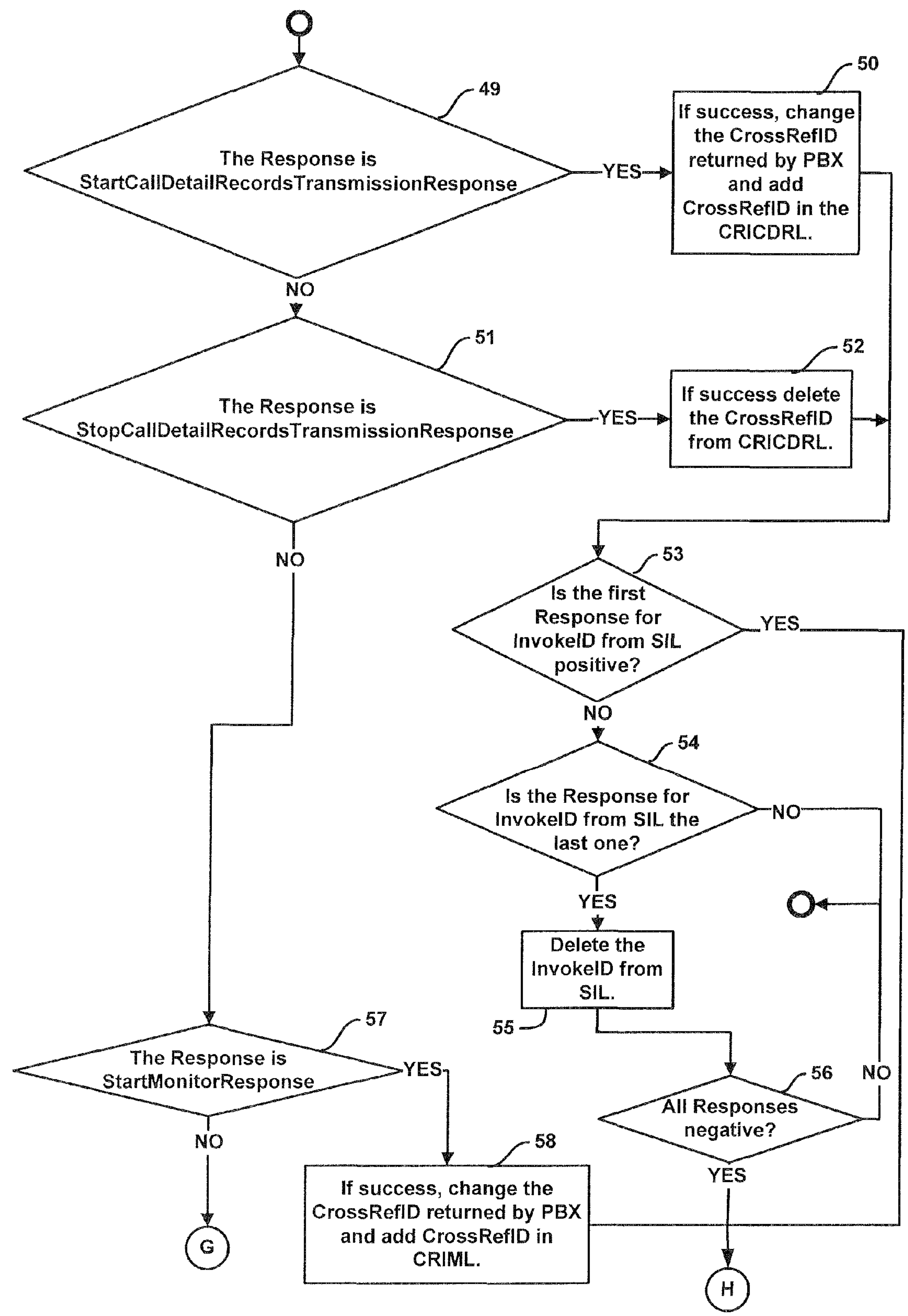
FIG. 6 is a block diagram of an algorithm associated with the Demultiplexer of FIG. 2 and for processing a CSTA Response received from a Communication Device.
Figure 6B:
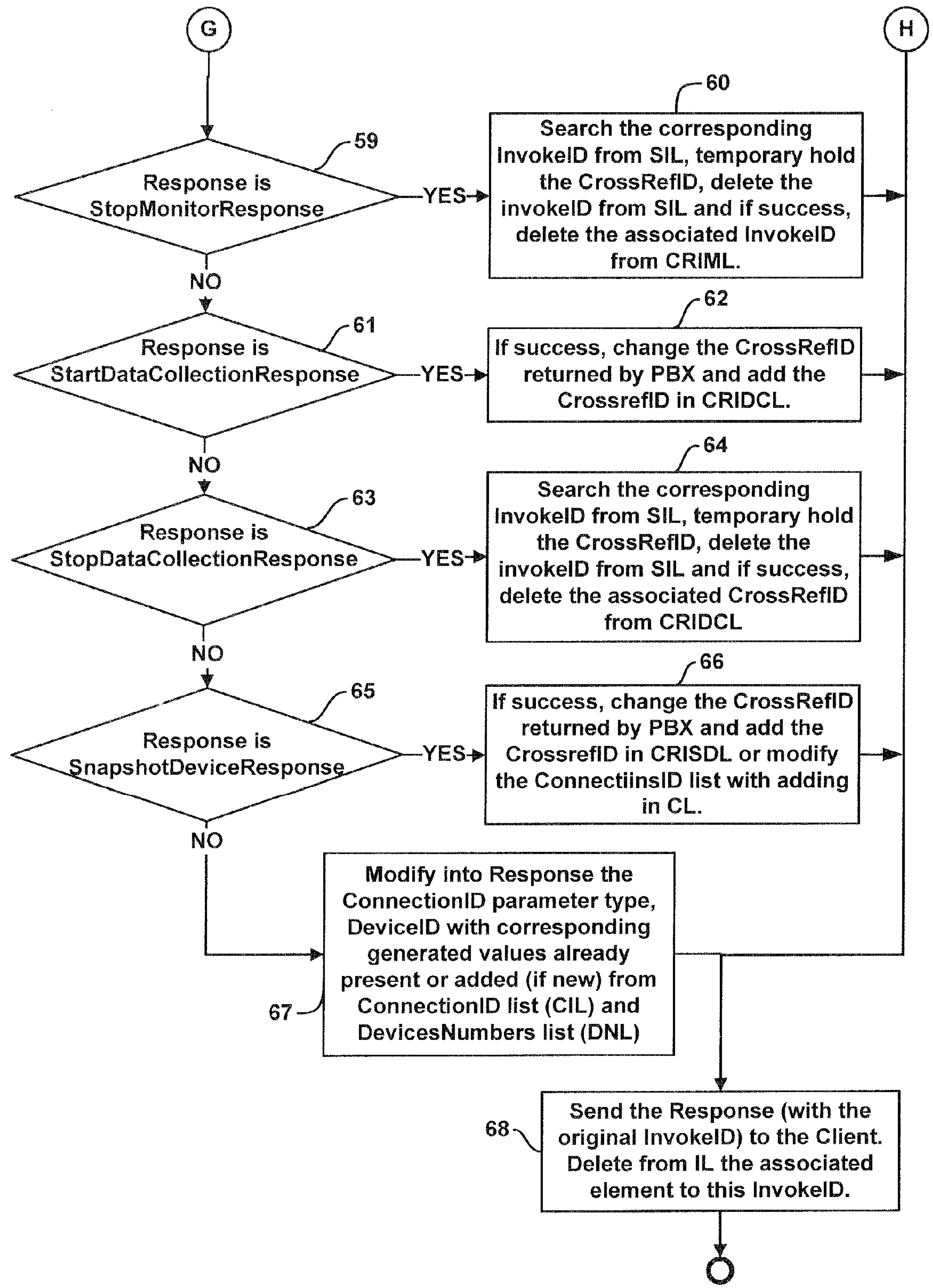

An illustrative processing of the CSTA Response message from Communication Device at step 45, is illustrated in FIG. 6 and includes at least one of the following steps:

At step 49, check if the Response is StartCallDetailRecordsTransmissionResponse. If confirmed, at step 50, if the Response is affirmative, add a CrossRefID in the CrossRefID CallDetailRecords list, and based on it, change CrossRefID in the Response. At step 53, check if the received Response is the first affirmative Response from the waited Responses series from every Communication Device for the corresponding element from the special Invokes list (SIL). If affirmative, at step 68 send the Response (with the original InvokeID) to the Client. Erase the elements with this InvokeID from the Invokes list.

If at step 53, the received Response is not the first affirmative Response from each Communication Device's waited Responses series for the corresponding element from the special Invokes list (SIL), then at step 54, check if the received Response is the last Response from each Communication Device's waited Responses series for the corresponding element from the special Invokes list (SIL). If it is, then at step 55, erase the associated element from special Invokes list (SIL). At step 56, check if all waited Responses for associated element from special Invokes list (SIL) are negative, and if so, go to step 68, else return to step 43 of FIG. 5.

If at step 49 the Response is not StartCallDetailRecordsTransmissionResponse, then at step 51, check if the Response is StopCallDetailRecordsTransmissionResponse. If confirmed, at step 52, if the Response is affirmative, delete the CrossRefID held in CrossRefID CallDetailRecords list, and go to step 53 and proceed as discussed above for steps 53-56.

If at step 51 the Response is not a StopCallDetailRecordsTransmissionResponse, then at step 57, check if the Response is a StartMonitorResponse. If so, at step 58, if the Response is affirmative, add a CrossRefID in CrossRefID monitor list (CRIML), and based on it, change the CrossRefID in Response. Go to step 68.

If at step 57 the Response is not a StartMonitorResponse, then at step 59, check if the Response is a StopMonitorResponse. If affirmative, at step 60, the CrossRefID from the special Invokes list (SIL) associated element is temporary held. Delete the element from the special Invokes list and if the Response is affirmative, delete the corresponding InvokeID from the CrossRef monitor list (CRML) and then go to step 68.

If at step 59 the Response is not a StopMonitorResponse, then at step 61 check if the Response is a StartDataCollectionResponse. If so, at step 62, if the Response is affirmative, add a CrossRefID into the CrossRefID DataCollection list (CRIDCL) and based on it, change the CrossRefID in the Response and then go to step 68.

If at step 61 the Response is not a StartDataCollectionResponse, then at step 63 check if the Response is a StopDataCollectionResponse. If so, at step 64, the CrossRefID from the special Invokes list (SIL) associated element is temporary held. Delete the corresponding InvokeID from the special Invokes list (SIL) and if the Response is affirmative, delete the corresponding CrossRefID from the CrossRefID DataCollection list (CRI DCL), then go to step 68.

If at step 63 the Response is not a StopDataCollectionResponse type, then at step 65, check if the Response is SnapshotDeviceResponse. If so, at step 66, if the Response is affirmative, add a CrossRefID in the CrossRefID SnapshotDevice list (CRISDL) and based on it, change the CrossRefID in the Response or, if needed, modify the ConnectionID list from Response, adding it in the ConnectionID list, then go to step 68.

If at step 65 the Response is not a SnapshotDeviceResponse type, then at step 67, modify the Response with the ConnectionID parameter type, DeviceID with the corresponding generated values is already present or added (if new) into the ConnectionID list (CIL) and DevicesNumbers list (DNL), then go to step 68.

At step 68 send the Response (with the original InvokeId) to the Client, and then delete this InvokeID element from Invokes list (IL). Return to step 43 shown in FIG. 5.

Figure 7A:
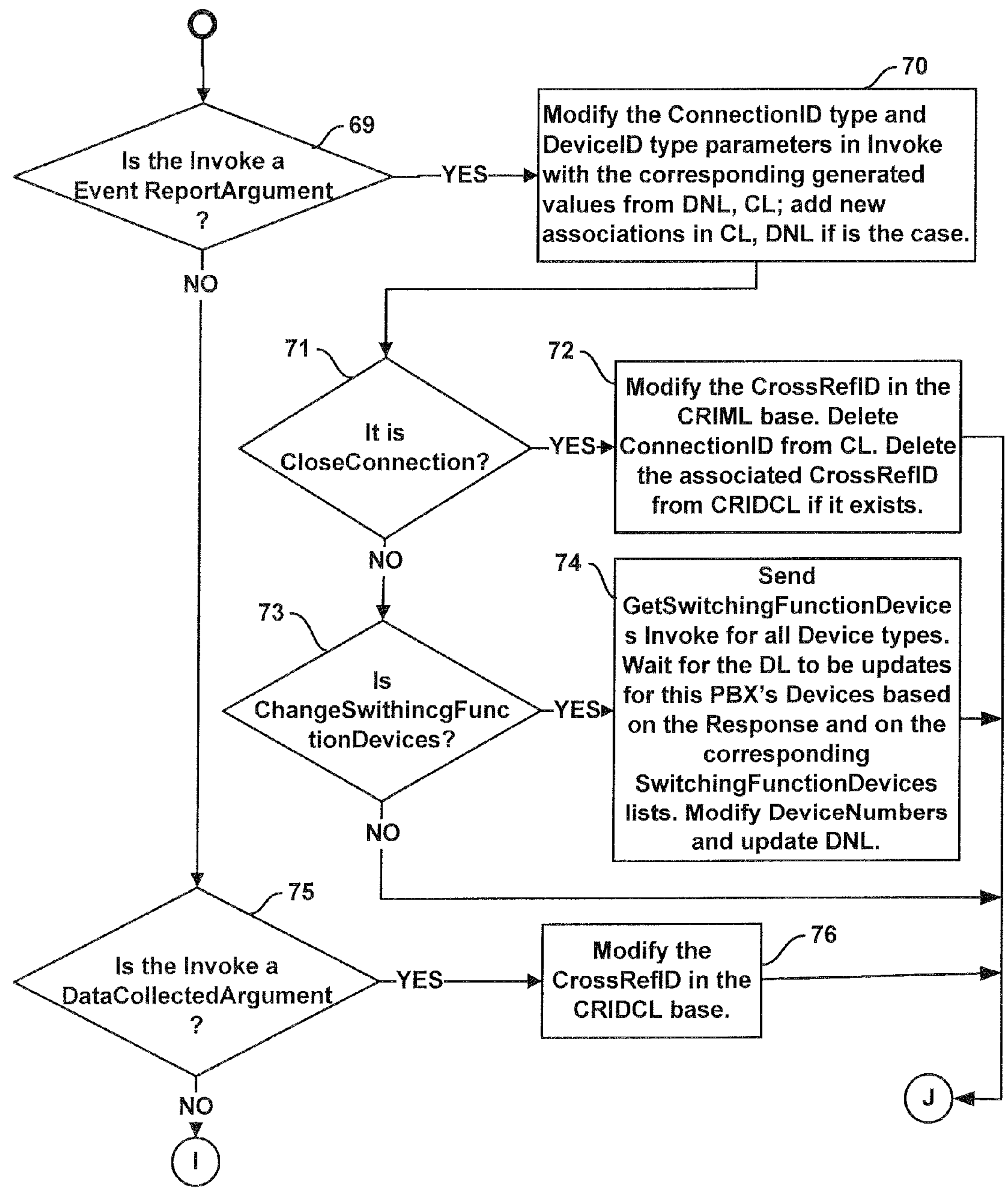
FIG. 7 is a block diagram of an algorithm associated with the Demultiplexer of FIG. 2 and for processing a CSTA Invoke received from a Communication Device.
Figure 7B:
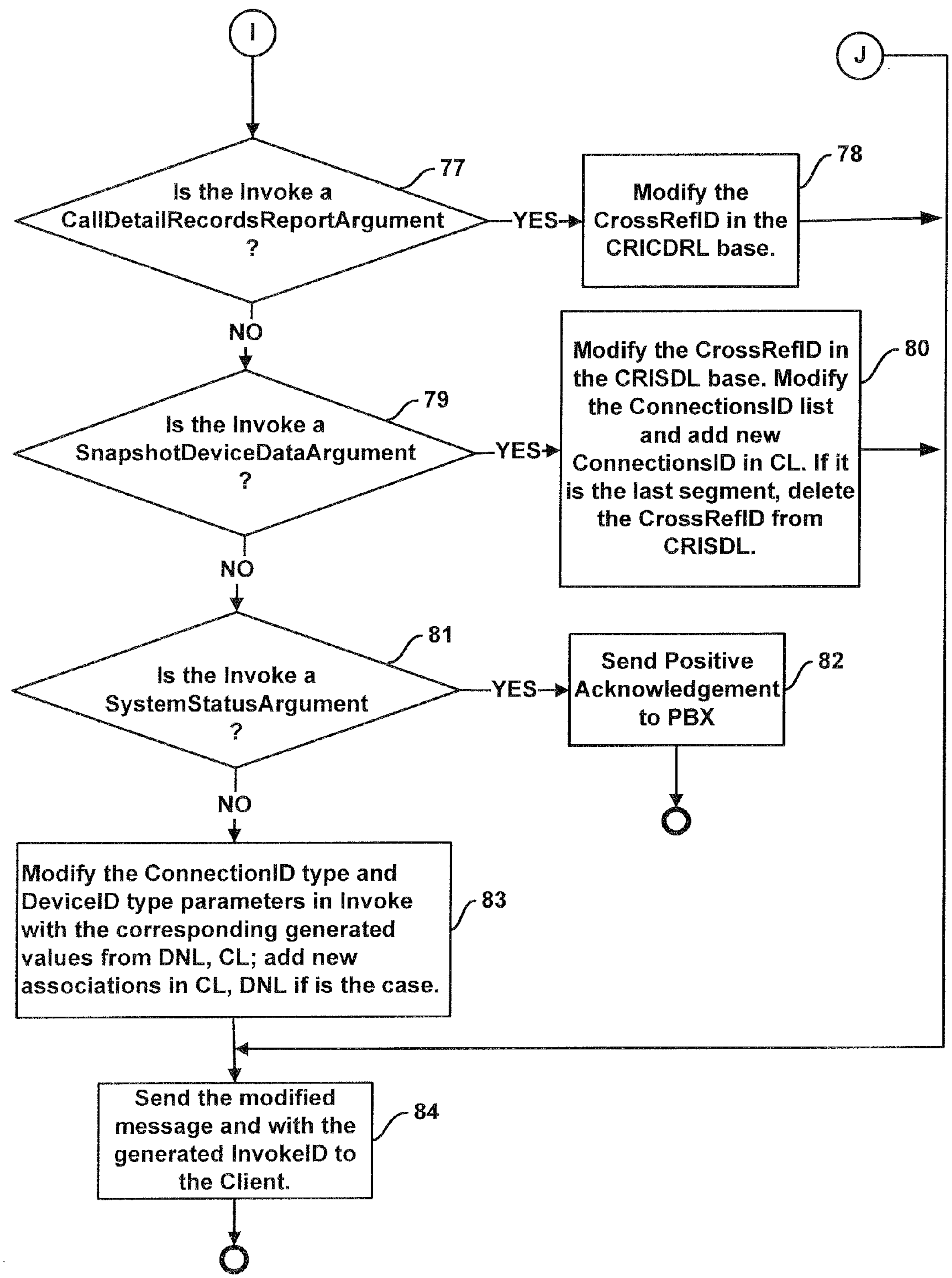

An illustrative processing of the CSTA Invoke message from Communication Device at step 47, is further illustrated in FIG. 7 and includes at least one of the following steps:

At step 69, check if the Invoke is EventReportArgument. If so, at step 70, modify the ConnectionID type parameter and the DeviceID in the Invoke with the corresponding generated values already present or added (if new) into the ConnectionID list (CIL) and the DevicesNumbers list (DNL).

At step 71, check if the reported event is CloseConnection type. If affirmative, in step 72 modify the CrossRefID in the Invoke based on the CrossRefID monitored list (CRIML) and delete the corresponding ConnectionID from the CrossRefID DataCollection list (CRIDCL) if it exists. Go to step 84 and send the modified InvokeId and the generated InvokeID to the Client, then return to step 47, FIG. 6.

If at step 71 the reported event is not CloseConnection type, then at step 73, check if the reported event is a ChangingSwitchingFunctionDevices type. If affirmative, at step 74, send GetSwitchingFunctionDevices Invoke to PBXi for all Device types. Wait for the Devices list to be completed for PBXi Devices based on the Response and the associated SwitchingFunctionDevices lists. Modify DeviceNumbers and update the DevicesNumbers list (DNL), then continue at step 84.

If at step 73 the reported event is not ChangingSwitchingFunctionDevices type, then continue at step 84.

If at step 69 the Invoke is not EventReportArgument type, then at step 75 check if Invoke is DataCollectedArgument. If affirmative, at step 76, modify the CrossRefID in the Invoke based on the CrossRefID DataCollection list. Continue at step 84.

If at step 75 the Invoke is not a DataCollectionArgument type, then at step 77, check if the Invoke is CallDetailRercordsReportArgument. If affirmative, at step 78, modify CrossRefID in the Invoke based on CrossRefID CallDetailRecords (CRICDR). Continue at step 84.

If at step 77 the Invoke is not CallDetailRercordsReportArgument type, then at step 79, check if the Invoke is SnapshotDeviceDataArgument. If so, at step 80, modify the CrossRefID in the Invoke based on the CrossRefID SnapshotDevice list (CRISDL) and if this one is the last segment, delete the CrossRefID from the CrossRefID SnapshotDevice list (CRISDL). Continue with step 84.

If at step 79 the Invoke is not SnapshotDeviceDataArgument type, then at step 81, check if the Invoke is SystemStatusArgument. If affirmative, at step 82, send a Positive Acknowledgment to Communication Device for this Invoke and return to step 47 in FIG. 7.

If at step 81 the Invoke is not SystemStatusArgument type, then at step 83, modify the ConnectionID type parameters in the Invoke with the DeviceID corresponding generated values already present or added (if new) in the ConnectionID list (CIL) and DevicesNumbers list (DNL). Go to step 84 and send the modified InvokeId and the generated InvokeID to the Client, then return to step 47, FIG. 6.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the following claims are desired to be protected.

The invention claimed is:

1. A system for connecting a Client Application limited to a single telephony connection to a plurality of Communication Devices, comprising:

a processor;

plurality of communications ports; and software enabling the processor and plurality of communications ports to:

support a first dialog process providing a first telephony association between the processor and Client Application;

support a second dialog process providing one of a second—$n^{th}$ telephony associations with each of the plurality of Communication Devices; and send, receive, and process messages associated with each of the second—$n^{th}$ telephony associations and with the first telephony association such that communications between processor and the Client Application are demultiplexed over the second—$n^{th}$ telephony associations with the plurality of Communications Devices; and wherein the first dialog process includes:

receiving a first association request message from a Client Application;

generating and sending an Accepted reply to a Client Application upon there being a second telephony association with a Communication Device and no first telephony association with a Client Application; and generating and sending a Reject reply to a Client Application upon there already being a telephony association with a Client Application or upon there being no second telephony association with a Communication Device.

2. The system of claim 1, wherein the first dialog process includes:

wherein the a first dialog process includes:

waiting for a message from the Client Application;

periodically sending a SystemStatus Invoke to the Client Application; and sending an Abort to the Client Application to close the first telephony association in the event there is not at least one Response message received from the Client Application for each three Invoke messages sent.

3. The system of claim 2, wherein the first dialog process includes:

determining if a message from the Client Application is an Invoke, and if so, process as an Invoke, including:

determining if a message from the Client Application is a Response, and if so, determining if the Response is a Positive Acknowledgement for the SystemStatus Invoke, else ignoring the message.

4. The system of claim 3, wherein the first dialog process includes:

determining if a message from the Client Application is Release message, and if so, sending a Release Response message to the Client Application and closing the first telephony association and resume waiting for another Request message from the Client Application; and determining if the message from the Client Application is an Abort message, and if so, closing the first telephony association and resume waiting for another Request message from the Client Application.

5. The system of claim 3, wherein the first dialog process includes processing of an Invoke message received from the Client Application, including:

a first list (IL) and a second list (DL);

storing an InvokeID in the first list;

determining if the Invoke is a GetSwitchingFunctionDevices type, and if so, generating and sending to the Client Application an affirmative Response and a sequence of SwitchingFunctionDevices retained in the second list (DL) obtained through the junction of second list of required types common for all Communication Devices, except for only one pbxSystem type Device, and deleting the InvokeID from the first list (IL).

6. The system of claim 5, wherein the first dialog process includes processing of an Invoke message received from the Client Application, including:

a third list (SIL); and determining if the Invoke a StartCallDetailRecordsTransmission type, and if so, adding an element to the third list (SIL), including the InvokeID and Invoke type, sending the Invoke to all Communication Devices and retaining the generated InvokeIDs for every Communication Device in the element of the third list (SIL).

7. The system of claim 6, wherein the first dialog process includes processing of an Invoke message received from the Client Application, including:

determining if the Invoke is a StopCallDetailRecordsTransmission type, and if so, adding an element in the third list (SIL) including the InvokeID and Invoke type, sending the Invoke to all Communication Devices with the corresponding CrossRefID for every Communication Device, and retaining the generated InvokeIDs for every Communication Device in the element in the third list (SIL).

8. The system of claim 7, wherein the first dialog process includes processing of an Invoke message received from the Client Application, including:

a fourth list (CL) and a fifth list (DNL);

determining if the Invoke is a StopMonitor type, and if so, adding an element in the third list (SIL) including the InvokeID, the Invoke type, and the CrossRefID, identifying the destination Communication Device by searching in fourth list (CL) the ConnectionID type and DeviceID type parameters from the Invoke, modifying the ConnectionID type and DeviceID type parameters in the Invoke message with the corresponding generated values from fifth list (DNL) and fourth list (CL), and sending the modified Invoke message to the destination Communication Device with a different InvokeID obtained from the element in the first list (IL).

9. The system of claim 8, wherein the first dialog process includes processing of an Invoke message received from the Client Application, including:

determining if the Invoke is a StopDataCollection type, and if so, adding an element in the third list (SIL), including the InvokeID, Invoke type and CrossRefID, identifying the destination Communication Device by searching in the fourth list (CL) the ConnectionID type and DeviceID type parameters from the Invoke message, modifying the ConnectionID type and DeviceID type parameters in the Invoke message with the corresponding generated values from the fifth list (DNL) and fourth list (CL), and sending the modified Invoke message to the destination Communication Device with a different InvokeID obtained from the element in the first list (IL).

10. The system of claim 1, wherein the second dialog process includes:

establishing one of a second—$n^{th}$ telephony associations with each of the plurality of Communication Devices;

sending an ACSE Request message to each of the plurality of Communication Devices for which an association is established; and upon each accepted association with one of the plurality of Communication Device:

sending GetSwitchingFunctionDevices Invoke for all Device types;

waiting for the Devices list (DL) to be completed for the one of the plurality of Communication Devices' Devices based on the Response and on the corresponding SwitchingFunctionSevices lists; and modifying the DevicesNumbers and updating the DevicesNumber list (DNL).

11. The system of claim 10, wherein the second dialog process includes waiting for a message received from one of the plurality of Communication Devices, including:

determining if a received message is a Response type, and if so, processing the Response message;

determining if a received message is a Invoke type, and if so, processing the Invoke message; and ignoring any message received from the plurality of Communication Devices if the message is not a Response or an Invoke type.

12. The system of claim 11, wherein the processing a Response message received from one of the plurality of Communication Devices, includes:

determining if the Response is StartCallDetailRecordsTransmissionResponse, and if so:

changing the CrossRefID returned by Communication Device; and adding CrossRefID in the list CRICDRL;

determining if the Response is StopCallDetailRecordsTransmissionResponse, and if so deleting the CrossRefID from the list CRICDRL; and if the Response is StartCallDetailRecordsTransmissionResponse or StopCallDetailRecordsTransmissionResponse:

determining if the first Response for InvokeID from the list SIL is positive, and if so:

sending the Response with the original InvokeID to the Client;

deleting from the list IL the associated element to this InvokeID; and returning to waiting for another message; and determining if the first Response for InvokeID from the SIL is not positive, and if so, if the Response is the last one, deleting the InvokeID from SIL and checking if all Responses are negative, and if so:

sending the Response with the original InvokeID to the Client;

deleting from the list IL the associated element to this InvokeID; and returning to waiting for another message; and determining if the Response for InvokeID is not the last one or if all the Responses are not negative, then returning to waiting for another message.

13. The system of claim 12, wherein the processing a Response message received from one of the plurality of Communication Devices, includes:

determining if the Response is StartMonitorResponse type, and if so:

changing the CrossRefID returned by the Communication Device; and adding the CrossRefID in the list CRIML;

determining if the Response is StopMonitorResponse type, and if so:

searching the corresponding InvokeID from the list SIL;

holding temporarily the CrossRefID;

deleting the invokeID from list SIL; and if success, deleting the associated InvokeID from list CRIML;

determining if the Response is StartDataCollectionResponse, and if so:

changing the CrossRefID returned by Communication Device; and adding the CrossrefID in the list CRIDCL;

determining if the Response is a StopDataCollectionResponse, and if so:

searching the corresponding InvokeID from the list SIL;

holding temporarily the CrossRefID;

deleting the invokeID from list SIL; and if success, deleting the associated CrossRefID from the list CRIDCL1;

determining if the Response is a SnapshotDeviceResponse, and if so:

changing the CrossRefID returned by Communication Device; and adding the CrossrefID in the list CRISDL or modifying the ConnectionID list CIL with adding in the list CL;

determining if the Response is not a SnapshotDeviceResponse, and if so:

modifying into the Response the ConnectionID parameter type, DeviceID with corresponding generated values already present or added (if new) from the ConnectionID list CIL and DevicesNumbers list DNL; and in all of the above cases:

sending the Response with the original InvokeID to the Client;

deleting from the list IL the associated element to this InvokeID; and returning to waiting for another message.

14. The system of claim 11, wherein the processing a Invoke message received from one of the plurality of Communication Devices, includes determining if the Invoke is EventReportArgument, if so:

modifying the ConnectionID type and DeviceID type parameters in Invoke with the corresponding generated values from lists DNL, CL; and adding new associations in lists CL, DNL if is the case;

determining if it is a CloseConnection, and if so:

modifying the CrossRefID in the CRIML base;

deleting ConnectionID from the list CL;

deleting the associated CrossRefID from the list CRIDCL if it exists; and sending the modified message with the generated InvokeID to the Client;

determining if it is not a CloseConnection, and if so determining if the Invoke is a ChangeSwitchingFunctionDevices, and if so:

sending GetSwitchingFunctionDevices Invoke for all Device types;

waiting for the list DL to be updated for this Communication Device's Devices based on the Response and on the corresponding SwitchingFunctionDevices lists; and modifying DeviceNumbers and updating the list DNL;

sending the modified message with the generated InvokeID to the Client; and returning to wait for another message.

15. The system of claim 11, wherein the processing a Invoke message received from one of the plurality of Communication Devices, includes:

determining if the Invoke is a DataCollectedArgument, and if so, modifying the CrossRefID in the CRIDCL base and sending the modified message with the generated InvokeID to the Client;

determining if the Invoke is a CallDetailRecordsReportArgument, and if so, modifying the CrossRefID in the CRICDRL base and sending the modified message with the generated InvokeID to the Client;

determining if the Invoke is a SnapshotDeviceDataArgument, and if so, modifying the CrossRefID in the CRISDL base, modifying the ConnectionsID list CIL and adding new ConnectionsID in the list CL; and if it is the last segment, deleting the CrossRefID from CRISDL and sending the modified message with the generated InvokeID to the Client;

determining if the Invoke is a SystemStatusArgument, and if so, sending positive acknowledgement to the Communication Device and if it is not a SystemStatusArgument, then:

modifying the ConnectionID type and DeviceID type parameters in the Invoke with the corresponding generated values from the lists DNL, CL;

adding new associations in lists CL, DNL if is the case; and sending the modified message and with the generated InvokeID to the Client.

16. The system of claim 1, wherein at least one of the Communication Devices includes a PBX and the first and the second—$n^{th}$ telephony associations are based on the CSTA standard.

17. The system of claim 1, wherein the processor executes both the Client Application and the software.

18. A communication system, comprising:

a CSTA Client Application supporting only a single computer telephony association;

a plurality of CSTA Communications Devices each adapted to support a computer telephony association with the Client Application; and a processing device having software enabling the processing device to:

support a first computer telephony association with the Client Application;

support a second—$n^{th}$ computer telephony association with the plurality of Communication Devices;

receive messages from the plurality of Communication Devices and generate responsive messages to the Client Application or to one or more of the plurality of Communication Devices, including an Accepted reply message to the Client Application upon there being a second telephony association with a Communication Device and no first telephony association with the Client Application, and further including a Reject reply to the Client Application upon there already being a telephony association with a Client Application or upon there being no second telephony association with a Communication Device; and receive messages from the Client Application and generate responsive messages to the Client Application or to one or more of the plurality of Communication Devices.

19. The communication system of claim 18, wherein the processing device process both the Client Application and the software.

20. The communication system of claim 18, wherein the plurality of Communications Devices include PBXs.

* * * * *